(12) United States Patent
Harkreader et al.

(10) Patent No.: US 7,620,169 B2
(45) Date of Patent: Nov. 17, 2009

(54) WAITING BUT NOT READY

(75) Inventors: Susan K. Harkreader, Arvada, CO (US); Gene Masaru Uba, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 742 days.

(21) Appl. No.: 10/174,278

(22) Filed: Jun. 17, 2002

(65) Prior Publication Data
US 2003/0231757 A1    Dec. 18, 2003

(51) Int. Cl.
*H04M 3/00* (2006.01)
(52) U.S. Cl. .............. 379/265.02; 379/265.01; 379/266.01; 379/266.03
(58) Field of Classification Search ............ 379/265.02, 379/265.09, 266.05, 266.01, 265.11, 215.01, 379/266.03, 266.06; 370/270
See application file for complete search history.

(56) References Cited

U.S. PATENT DOCUMENTS

| | | | |
|---|---|---|---|
| 4,163,124 A | 7/1979 | Jolissaint | |
| 4,567,323 A | 1/1986 | Lottes et al. | |
| 4,737,983 A | 4/1988 | Frauenthal et al. | |
| 4,797,911 A | 1/1989 | Szlam et al. | |
| 4,894,857 A | 1/1990 | Szlam et al. | |
| 5,001,710 A | 3/1991 | Gawrys et al. | |
| 5,097,528 A | 3/1992 | Gursahaney et al. | |
| 5,101,425 A | 3/1992 | Darland | |
| 5,155,761 A | 10/1992 | Hammond | |
| 5,164,983 A | 11/1992 | Brown et al. | |
| 5,206,903 A | 4/1993 | Kohler et al. ............ 379/309 |
| 5,210,789 A | 5/1993 | Jeffus et al. | |
| 5,274,700 A | 12/1993 | Gechter et al. | |
| 5,278,898 A | 1/1994 | Cambray et al. | |
| 5,291,550 A | 3/1994 | Levy et al. | |
| 5,299,260 A | 3/1994 | Shaio | |
| 5,309,513 A | 5/1994 | Rose | |
| 5,335,268 A | 8/1994 | Kelly, Jr. et al. | |
| 5,335,269 A | 8/1994 | Steinlicht | |
| 5,390,243 A | 2/1995 | Casselman et al. | |
| 5,436,965 A | 7/1995 | Grossman et al. | |
| 5,444,774 A | 8/1995 | Friedes | |
| 5,469,503 A | 11/1995 | Butensky et al. | |
| 5,469,504 A | 11/1995 | Blaha | |
| 5,473,773 A | 12/1995 | Aman et al. | |

(Continued)

FOREIGN PATENT DOCUMENTS

CA    2143198    1/1995

(Continued)

OTHER PUBLICATIONS

U.S. Appl. No. 09/756,955, filed Jan. 9, 2001, Flockhart et al.

(Continued)

*Primary Examiner*—Rasha S Al Aubaidi
(74) *Attorney, Agent, or Firm*—Sheridan Ross P.C.

(57) ABSTRACT

The invention is directed to a system for distributing contacts to a plurality of resources in a contact center, comprising at least one resource 104 for serving contacts 114; at least a first set 110 of contacts 114 awaiting service by the at least one resource 104, wherein each of the contacts in the first set 110 of contacts 114 has a corresponding state 140; and a selection agent 132 operable to assign a resource 104 to serve the contact 114 when a contact in the first set 110 of contacts has a first state and not assign the resource 104 to serve the contact 114 when a contact 114 in the first set of contacts 110 has a second state that is different from the first state. A state monitor 128 can be used to change the state of a contact between the first and second states.

36 Claims, 6 Drawing Sheets

U.S. PATENT DOCUMENTS

| | | | |
|---|---|---|---|
| 5,479,497 A | 12/1995 | Kovarik | |
| 5,500,795 A | 3/1996 | Powers et al. | |
| 5,504,894 A | 4/1996 | Ferguson et al. | |
| 5,506,898 A | 4/1996 | Constantini et al. | |
| 5,530,744 A | 6/1996 | Charalambous et al. | |
| 5,537,470 A | 7/1996 | Lee | |
| 5,537,542 A | 7/1996 | Eilert et al. | |
| 5,544,232 A | 8/1996 | Baker et al. | |
| 5,546,452 A | 8/1996 | Andrews et al. | |
| 5,592,378 A | 1/1997 | Cameron et al. | |
| 5,592,542 A | 1/1997 | Honda et al. | |
| 5,594,726 A | 1/1997 | Thompson et al. | |
| 5,606,361 A | 2/1997 | Davidsohn et al. | |
| 5,611,076 A | 3/1997 | Durflinger et al. | |
| 5,627,884 A | 5/1997 | Williams et al. | |
| 5,642,515 A | 6/1997 | Jones et al. | |
| 5,684,872 A | 11/1997 | Flockhart et al. | 379/266 |
| 5,684,874 A | 11/1997 | Yagyu et al. | |
| 5,684,964 A | 11/1997 | Powers et al. | |
| 5,689,698 A | 11/1997 | Jones et al. | |
| 5,703,943 A | 12/1997 | Otto | |
| 5,713,014 A | 1/1998 | Durflinger et al. | |
| 5,724,092 A | 3/1998 | Davidsohn et al. | |
| 5,740,238 A | 4/1998 | Flockhart et al. | |
| 5,742,675 A | 4/1998 | Kilander et al. | |
| 5,748,468 A | 5/1998 | Notenboom et al. | |
| 5,749,079 A | 5/1998 | Yong et al. | |
| 5,751,707 A | 5/1998 | Voit et al. | |
| 5,752,027 A | 5/1998 | Familiar | |
| 5,754,639 A * | 5/1998 | Flockhart et al. | 379/266.05 |
| 5,754,776 A | 5/1998 | Hales et al. | |
| 5,754,841 A | 5/1998 | Carino, Jr. | |
| 5,757,904 A | 5/1998 | Anderson | |
| 5,790,677 A | 8/1998 | Fox et al. | |
| 5,794,250 A | 8/1998 | Carino, Jr. et al. | |
| 5,796,393 A | 8/1998 | MacNaughton et al. | |
| 5,802,282 A | 9/1998 | Hales et al. | |
| 5,818,907 A | 10/1998 | Maloney et al. | |
| 5,825,869 A | 10/1998 | Brooks et al. | |
| 5,828,747 A | 10/1998 | Fisher et al. | 379/309 |
| 5,838,968 A | 11/1998 | Culbert | |
| 5,839,117 A | 11/1998 | Cameron et al. | |
| 5,875,437 A | 2/1999 | Atkins | |
| 5,880,720 A | 3/1999 | Iwafune et al. | |
| 5,881,238 A | 3/1999 | Aman et al. | |
| 5,884,032 A | 3/1999 | Bateman et al. | |
| 5,889,956 A | 3/1999 | Hauser et al. | |
| 5,897,622 A | 4/1999 | Blinn et al. | |
| 5,903,641 A | 5/1999 | Tonisson | |
| 5,903,877 A | 5/1999 | Berkowitz et al. | |
| 5,905,793 A | 5/1999 | Flockhart et al. | 379/266 |
| 5,915,012 A | 6/1999 | Miloslavsky | |
| 5,926,538 A | 7/1999 | Deryugin et al. | |
| 5,930,786 A | 7/1999 | Carino, Jr. et al. | |
| 5,937,051 A | 8/1999 | Hurd et al. | |
| 5,937,402 A | 8/1999 | Pandilt | |
| 5,940,496 A | 8/1999 | Gisby et al. | |
| 5,943,416 A | 8/1999 | Gisby | |
| 5,948,065 A | 9/1999 | Eilert et al. | |
| 5,960,073 A | 9/1999 | Kikinis et al. | |
| 5,963,635 A | 10/1999 | Szlam et al. | |
| 5,963,911 A | 10/1999 | Walker et al. | |
| 5,970,132 A | 10/1999 | Brady | |
| 5,974,135 A | 10/1999 | Breneman et al. | |
| 5,974,462 A | 10/1999 | Aman et al. | |
| 5,982,873 A | 11/1999 | Flockhart et al. | 379/266 |
| 5,987,117 A | 11/1999 | McNeil et al. | |
| 5,991,392 A | 11/1999 | Miloslavsky | |
| 5,996,013 A | 11/1999 | Delp et al. | |
| 5,999,963 A | 12/1999 | Bruno et al. | |
| 6,000,832 A | 12/1999 | Franklin et al. | |
| 6,011,844 A | 1/2000 | Uppaluru et al. | |
| 6,038,293 A | 3/2000 | Mcnerney et al. | |
| 6,044,144 A | 3/2000 | Becker et al. | |
| 6,044,205 A | 3/2000 | Reed et al. | |
| 6,044,355 A | 3/2000 | Crockett et al. | |
| 6,049,547 A | 4/2000 | Fisher et al. | |
| 6,052,723 A | 4/2000 | Ginn | |
| 6,055,308 A | 4/2000 | Miloslavsky et al. | |
| 6,064,730 A | 5/2000 | Ginsberg | |
| 6,064,731 A | 5/2000 | Flockhart et al. | 379/266 |
| 6,084,954 A | 7/2000 | Harless et al. | 379/140 |
| 6,088,441 A | 7/2000 | Flockhart et al. | 379/265 |
| 6,115,462 A | 9/2000 | Servi et al. | |
| 6,151,571 A | 11/2000 | Pertrushin | |
| 6,154,769 A | 11/2000 | Cherkasova et al. | |
| 6,163,607 A | 12/2000 | Bogart et al. | 379/266 |
| 6,173,053 B1 | 1/2001 | Bogart et al. | 379/266 |
| 6,175,564 B1 | 1/2001 | Miloslavsky et al. | |
| 6,178,441 B1 | 1/2001 | Elnozahy | |
| 6,185,292 B1 | 2/2001 | Miloslavsky | |
| 6,192,122 B1 | 2/2001 | Flockhart et al. | 379/266 |
| 6,215,865 B1 | 4/2001 | McCalmont | |
| 6,226,377 B1 | 5/2001 | Donaghue, Jr. | |
| 6,229,819 B1 | 5/2001 | Darland et al. | |
| 6,230,183 B1 | 5/2001 | Yocom et al. | |
| 6,233,333 B1 | 5/2001 | Dezonmo | |
| 6,240,417 B1 | 5/2001 | Eastwick | |
| 6,259,969 B1 | 7/2001 | Tackett et al. | 700/264 |
| 6,263,359 B1 | 7/2001 | Fong et al. | |
| 6,272,544 B1 | 8/2001 | Mullen | |
| 6,275,806 B1 | 8/2001 | Pertrushin | |
| 6,275,812 B1 | 8/2001 | Haq et al. | |
| 6,275,991 B1 | 8/2001 | Erlin | 725/141 |
| 6,278,777 B1 | 8/2001 | Morley et al. | 379/265 |
| 6,292,550 B1 | 9/2001 | Burritt | 379/201 |
| 6,295,353 B1 | 9/2001 | Flockhart et al. | |
| 6,353,810 B1 | 3/2002 | Petrushin | |
| 6,356,632 B1 | 3/2002 | Foster et al. | |
| 6,366,668 B1 | 4/2002 | Borst et al. | |
| 6,389,028 B1 | 5/2002 | Bondarenko et al. | |
| 6,389,132 B1 | 5/2002 | Price | 379/265.01 |
| 6,389,400 B1 | 5/2002 | Bushey et al. | |
| 6,424,709 B1 | 7/2002 | Doyle et al. | |
| 6,426,950 B1 | 7/2002 | Mistry | |
| 6,427,137 B2 | 7/2002 | Petrushin | |
| 6,430,282 B1 | 8/2002 | Bannister et al. | |
| 6,434,230 B1 | 8/2002 | Gabriel | |
| 6,449,356 B1 | 9/2002 | Dezonno | |
| 6,449,358 B1 | 9/2002 | Anisimov et al. | |
| 6,449,646 B1 | 9/2002 | Sikora et al. | |
| 6,453,038 B1 | 9/2002 | McFarlane et al. | |
| 6,463,148 B1 | 10/2002 | Brady | |
| 6,463,346 B1 | 10/2002 | Flockhart et al. | |
| 6,463,415 B2 | 10/2002 | St. John | |
| 6,480,826 B2 | 11/2002 | Pertrushin | |
| 6,490,350 B2 | 12/2002 | McDuff et al. | |
| 6,535,600 B1 | 3/2003 | Fisher et al. | 379/265.12 |
| 6,535,601 B1 | 3/2003 | Flockhart et al. | |
| 6,560,330 B2 | 5/2003 | Gabriel | |
| 6,560,649 B1 | 5/2003 | Mullen et al. | |
| 6,560,707 B2 | 5/2003 | Curtis et al. | |
| 6,563,916 B1 * | 5/2003 | Deutsch et al. | 379/215.01 |
| 6,563,920 B1 | 5/2003 | Flockhart et al. | |
| 6,597,685 B2 | 7/2003 | Miloslavsky et al. | |
| 6,614,903 B1 | 9/2003 | Flockhart et al. | |
| 6,650,748 B1 | 11/2003 | Edwards et al. | |
| 6,697,457 B2 | 2/2004 | Petrushin | |
| 6,704,409 B1 | 3/2004 | Dilip et al. | |
| 6,707,903 B2 | 3/2004 | Qutub et al. | |
| 6,754,333 B1 | 6/2004 | Flockhart et al. | |
| 6,766,013 B2 | 7/2004 | Flockhart et al. | |
| 6,771,765 B1 * | 8/2004 | Crowther et al. | 379/265.09 |
| 6,822,945 B2 * | 11/2004 | Petrovykh | 370/270 |

| | | | |
|---|---|---|---|
| 6,947,543 | B2 | 9/2005 | Alvarado et al. |
| 6,959,081 | B2 * | 10/2005 | Brown et al. ............ 379/265.11 |
| 6,978,006 | B1 * | 12/2005 | Polcyn .................. 379/265.12 |
| 7,035,808 | B1 | 4/2006 | Ford |
| 7,035,927 | B2 | 4/2006 | Flockhart et al. |
| 7,050,568 | B2 * | 5/2006 | Brown et al. ............ 379/266.01 |
| 7,076,051 | B2 * | 7/2006 | Brown et al. ............ 379/265.09 |
| 7,095,842 | B2 * | 8/2006 | Brown et al. ............ 379/266.01 |
| 7,245,716 | B2 * | 7/2007 | Brown et al. ............ 379/266.01 |
| 2002/0194002 | A1 | 12/2002 | Petrushin |
| 2003/0108184 | A1 * | 6/2003 | Brown et al. ............ 379/265.09 |
| 2004/0203878 | A1 | 10/2004 | Thomson |

FOREIGN PATENT DOCUMENTS

| | | |
|---|---|---|
| CA | 2174762 | 6/1995 |
| EP | 0 501 189 A2 | 9/1992 |
| EP | 0 740 450 A2 | 10/1996 |
| EP | 0 772 335 A2 | 5/1997 |
| EP | 0 855 826 A2 | 7/1998 |
| EP | 0 863 651 A2 | 9/1998 |
| EP | 0829996 A2 | 9/1998 |
| EP | 0866407 A1 | 9/1998 |
| EP | 899673 A2 | 3/1999 |
| EP | 998108 A1 | 5/2000 |
| EP | 1091307 A2 | 4/2001 |
| EP | 1150236 | 10/2001 |
| GB | 2 273 418 | 6/1994 |
| GB | 2 290 192 A | 12/1995 |
| WO | WO 96/07141 | 3/1996 |
| WO | WO 97/28635 | 8/1997 |
| WO | WO 98/56207 | 12/1998 |

OTHER PUBLICATIONS

U.S. Appl. No. 10/098,824, filed Mar. 15, 2002, Boyer et al.
U.S. Appl. No. 10/099,144, filed Mar. 15, 2002, Boyer et al.
Presentation by Victor Zue, *The MIT Ox9Oygen Project*, MIT Laboratory for Computer Science (Apr. 25-26, 2000).
MIT Project Oxygen, *Pervasive, Human-Centered Computing* (MIT Laboratory for Computer Science) (Jun. 2000).
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
Avaya, Inc. CentreVu Advocate, Release 9, User Guide, Dec. 2000.
Avaya, Inc., "Better Implementation of IP in Large Networks," Avaya, Inc. 2002, 14 pages.
Avaya, Inc., "The Advantages of Load Balancing in the Multi-Call Center Enterprise," Avaya, Inc., 2002, 14 pages.
Avaya, Inc., "Voice Over IP Via Virtual Private Networks: An Overview," Avaya, Inc., Feb. 2001, 9 pages.
Bellsouth Corp., "Frequently Asked Questions—What is a registrar?," available at https://registration.bellsouth.net/NASApp/DNSWebUI/FAQ.jsp, 2002, 4 pages.
Coles, Scott, "A Guide for Ensuring Service Quality In IP Voice Networks," Avaya, Inc., 2002, pp. 1-17.
Dawson, "NPRI's Powerguide, Software Overview" Call Center Magazine (Jun. 1993), p. 85.
Doo-Hyun Kim et al. "Collaborative Multimedia Middleware Architecture and Advanced Internet Call Center," Proceedings at the International Conference on Information Networking (Jan. 31, 2001), pp. 246-250.
E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz 8 pages; printed Feb. 10, 2003 (believed to be dated 1999).
Foster, Robin, et al., "Avaya Business Advocate and its Relationship to Multi-Site Load Balancing Applications," Avaya, Inc., Mar. 2002, 14 pages.
GEOTEL Communications Corporation Web site printout entitled "Intelligent CallRouter" Optimizing the Interaction Between Customers and Answering Resources. 6 pages; 1998.
John H.L. Hansen and Levent M. Arsian, Foreign Accent Classification Using Source Generator Based Prosodic Features, IEEE Proc. ICASSP, vol. 1, pp. 836-839, Detroit USA (May 1995).
L.F. Lamel and J.L. Gauvain, Language Identification Using Phone-Based Acoustic Likelihood, ICASSP-94, 4 pages; undated.
Levent M. Arsian and John H.L. Hansen, Language Accent Classification in American English, Robuts Speech Processing Laboratory, Duke University Department of Electrical Engineering, Durham, NC, Technical Report RSPL-96-7, revised Jan. 29, 1996. pp. 1-16.
Levent M. Arsian, Foreign Accent Classification in American English, Department of Electrical Computer Enigineering, Duke University, Thesis, pp. 1-200 (1996).
"Applications, NPRI's Predictive Dialing Package," Computer Technology (Fall 1993), p. 86.
"Call Center Software You Can't Outgrow," Telemarketing® (Jul. 1993), p. 105.
"eGain's Commerce 2000 Platform Sets New Standard for eCommerce Customer Communications," Business Wire (Nov. 15, 1999)., 3 pages.
"Product Features," Guide to Call Center Automation, Brock Control Systems, Inc., Activity Managers Series™, Section 5—Company B120, p. 59, 1992.
"Product Features," Guide to Call Center Automation, CRC Information Systems, Inc., Tel-ATHENA, Section 5—Company C520, p. 95, 1992.
"Vast™, Voicelink Application Software for Teleservicing®," System Manager User's Guide, Digital Systems (1994), pp. ii, vii-ix, 1-2, 2-41 through 2-77.
"When Talk Isn't Cheap," Sm@rt Reseller, v. 3, n. 13 (Apr. 3, 2000), p. 50.
Avaya, Inc. Business Advocate Options, at http://www.avaya.com, downloaded on Feb. 15, 2003, Avaya, Inc. 2003.
Avaya, Inc. Business Advocate Product Summary, at http://www.avaya.com, downloaded on Feb. 15, 2003, Avaya, Inc. 2003, 3 pages.
Chavez, David, et al., "Avaya MultiVantage Software: Adapting Proven Call Processing for the Transition to Converged IP Networks," Avaya, Inc., Aug. 2002.
Stevenson et al.; "Name Resolution in Network and Systems Management Environments"; http://netman.cit.buffalo. edu/Doc/DStevenson/NR-NMSE.html; printed Mar. 31, 2003; 16 pages.
"Domain Name Services," available at http://www.pism.com/chapt09/chapt09.html, downloaded Mar. 31, 2003, 21 pages.
"Internet Protocol Addressing," available at http://samspade.org/d/ipdns.html, downloaded Mar. 31, 2003, 9 pages.

* cited by examiner

WAITING BUT NOT READY

FIELD OF THE INVENTION

The invention relates generally to contact centers and specifically to queuing arrangements in automatic call-distribution systems.

BACKGROUND OF THE INVENTION

In automatic call-distribution or ACD systems, contacts incoming to a contact center are answered and handled by a plurality of resources, such as agents. The ACD system automatically distributes and connects incoming contacts to whatever resources are suited to handle the contacts and available, that is, not handling other contacts at that moment. A contact can be effected by any communication medium, such as a trunk or telephone line, and wirelessly and by any mode, such as by telephone, email, Web server, and the Internet.

It often happens that contactors, while awaiting service by a resource, need to accomplish other tasks or perform other duties, such as answering an incoming call, going to the bathroom, attending to children, and the like. In conventional ACD systems, if the contactor is absent when the contact is handed off to a resource for service, the resource must decide whether to wait for the contactor to return or to service the next contact. Commonly, the contact is terminated by the resource due to heavy workload and/or uncertainty about what happened to the contactor. This can cause customer frustration and lost business.

SUMMARY OF THE INVENTION

These and other needs are addressed by the various embodiments and configurations of the present invention. The method and apparatus of the present invention permit a contact to be flagged as not ready to be served. The contactor corresponding to the contact can then attend to other duties without losing his or her position in the queue.

In one embodiment, a flag is used to indicate state or mode. As will be appreciated, a flag is a variable or data structure indicating that a certain condition exists as to the item or system corresponding to the flag. The flag is associated with the enqueued data structures corresponding to each contact. In one setting, the flag indicates that the contact is in a first state in which the contact is eligible for service. In one implementation, the first state is referred to as the Waiting And Ready state or WR state. Each new contact is initialized in the WR state. In a different setting, the flag indicates that the contact is in a second, different state in which the contact is ineligible for service. In the implementation referred to previously, the second state is referred to as the Waiting But Not Ready or WNR state. A contact is commonly changed to the WNR state at some point after being placed in the queue. Background music and/or messages can provide feedback to the contact to let him know which state he is currently waiting in and how to change to the other state.

The relative positions of the enqueued contacts in a first queue are not impacted by the particular state assigned to the contact until the contact reaches the head of the first queue. When a first contact in the WNR state reaches the head of the first queue, the first contact is moved to a second, different queue or is held at the head of the first queue. Subsequently enqueued contacts that are in the WR state can skip over the first contact to be serviced by the next available resource. In this manner, contacts in the WNR state at the head of the queue or in the second queue will not block other contacts from progressing through the first queue. In either event, when the WNR state of the first contact is changed to the WR state, the first contact is considered to be eligible for service and is treated as being at the head of the queue waiting to be assigned to the next available resource.

The invention can have several advantages. First, the invention can provide increased levels of service and customer convenience and satisfaction. Customers can flag themselves as being not ready for service without losing their enqueued positions. The customer can walk away and attend to other duties while remaining in a wait queue for service. When ready for service, the customer can cause his or her status to be changed and resume his or her position in the queue. Second, the invention can permit a customer to wait in multiple queues simultaneously without losing his or her position in any of the other queues when a resource corresponding to one of the queues serves the customer. While being served in a first queue, the customer's status can be changed from the WR state to the WNR state in the other queues. When service is completed, the customer can be changed back to the WR state in the other queues.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
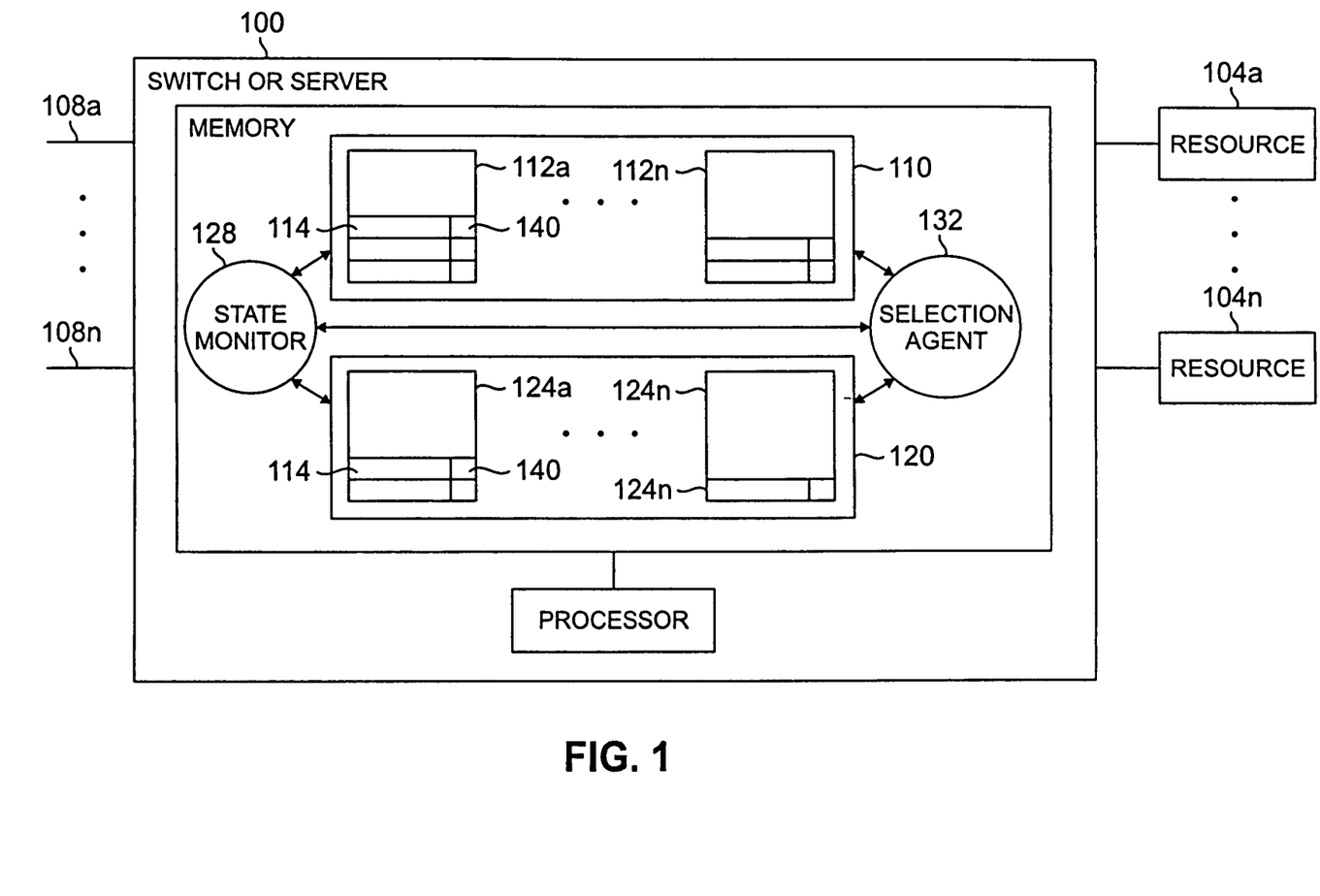
FIG. 1 is a block diagram of a contact center that includes an illustrative embodiment of the present invention.

FIG. 1 shows an illustrative contact center that comprises an automatic contact-distribution switch or server 100 serving a plurality of resources 104*a-n*. The resources 104*a-n* can be any machine, human, and/or computer entity that provides services and/or information to contactors (e.g., agents, adjunct processors, etc.). In one configuration, the resources are agents having corresponding voice-and-data terminals connected to the switch or server 100 by a voice-and-data transmission medium. The switch or server 100 is connected to a plurality of communication lines 108*a-n* (e.g., telephone lines or trunks) over which it receives incoming contacts. It then distributes and connects the contacts to appropriate (available) resources based on a set of predetermined criteria. The resources process the contacts sent to them by the switch or server 100.

The contact center can be any architecture for serving contacts using one or more resources. Illustratively, the contact center of FIG. 1 can be the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference, or Avaya Inc.'s Definity™ private-branch exchange (PBX)-based ACD system. The contact center typically is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. Included among the data stored in the contact center is a set 110 contact queues 112*a-n* containing contacts 114 and a set of agent queues (not shown). Each contact queue 112*a-n* corresponds to a different agent skill, as does each agent queue. Conventionally, contacts are prioritized, and either are enqueued in individual ones of queues 112*a-n* in their order of priority or are enqueued in different ones of a plurality of contact queues that correspond to a skill and each one of which corresponds to a different priority. An agent may have multiple skills, and hence may be assigned to multiple agent queues simultaneously. A call vector (not shown) is used to route incoming contacts to different queues based upon predetermined criteria. Call vectoring is described in Definity™ Communications System Generic 3 Call Vectoring/Expert Agent Selection (EAS) Guide, AT&T publication no. 555-230-520 (Issue 3, Nov. 1993) which is incorporated herein by reference. As explained in detail in the above-referenced patents, Estimated Wait Time or EWT agent (not shown) provides information regarding an estimated wait time for a selected contact.

According to the invention, the contact center further comprises a set 120 of high priority queues 124*a-n* containing contacts that have elected to wait for servicing, state monitor 128 for assigning one of a waiting-and-ready or WR state and a waiting-but-not ready or WNR state to an enqueued contact, and a selection agent 132 for selecting enqueued contacts for servicing and for transferring enqueued contacts, that are eligible for servicing but are assigned the WNR state, from a queue 112 in the queue set 110 to a corresponding queue 124 in the queue set 120. Each queue in queue set 110 normally has a corresponding high priority queue in queue set 120, though a plurality of queues in queue set 110 can have only one corresponding queue in queue set 120. The WR state refers to a contact that is waiting for service and desires to be serviced when it reaches the head of the queue, and the WNR state to a contact that is waiting for service but does not desire to be serviced when it reaches the head of the queue. State monitor 128 and selection agent 132 are stored either in main memory (shown) or in a peripheral memory (e.g., disk, CD ROM, etc.) or some other computer-readable medium of the contact center.

Figure 2:
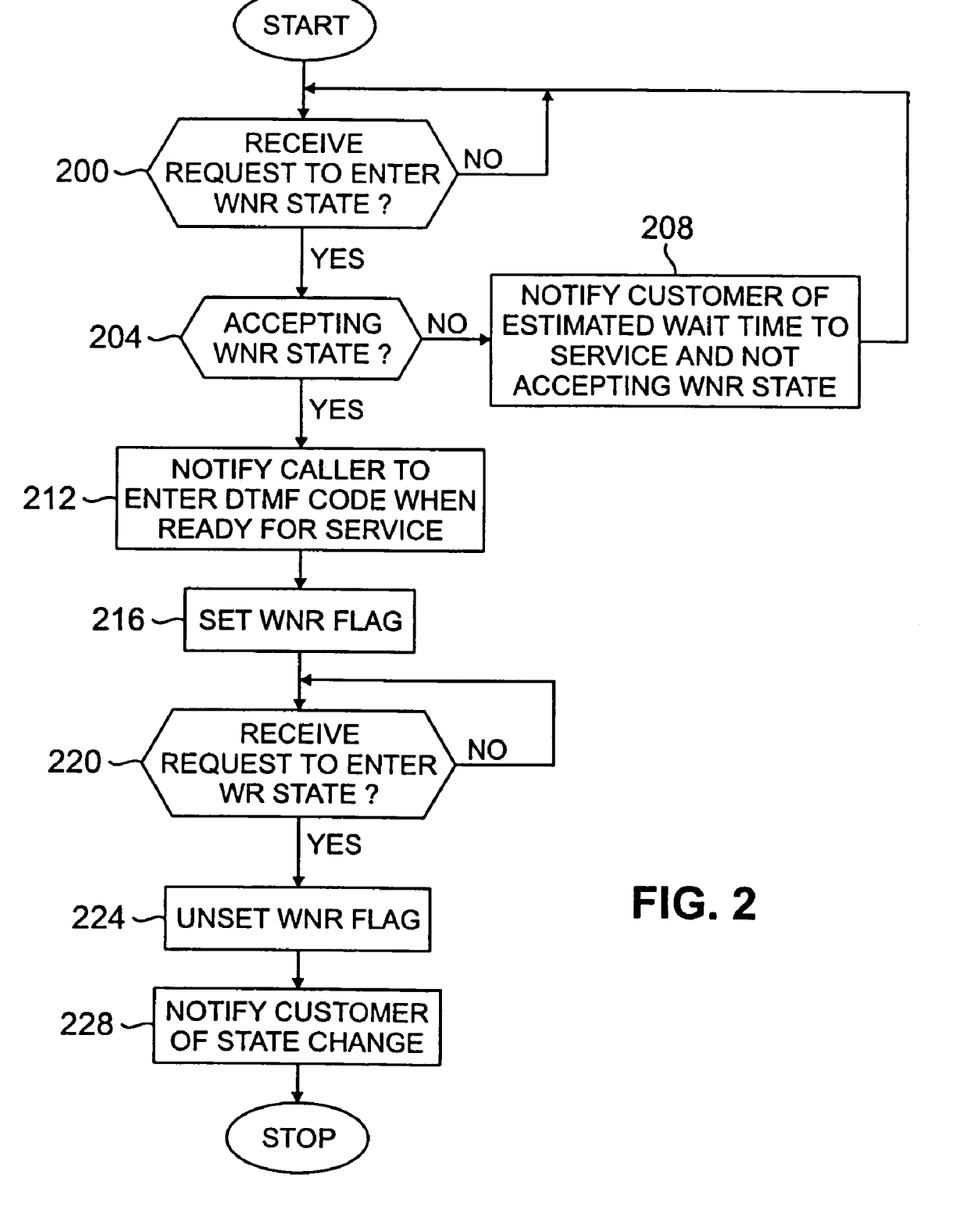
FIG. 2 is a flow diagram of operations of the state monitor in the contact center of FIG. 1.

The functionality implemented by an illustrative embodiment of state monitor 128 is shown in FIG. 2. All contacts are initialized in the WR state when enqueued in a queue 112. The state monitor 128 can be configured to provide an announcement to a contactor informing the contactor how to request assignment from the WR state to the WNR state. The announcement can be repeated at predetermined intervals to encourage such requests. The requests can be generated and transmitted by a contact by any suitable technique, such as by pressing a first predetermined code. The first code can be a predetermined set or sequence of bits, a feature access code or DTMF digit(s), a voice command, or any other type or form of signal.

In step 200, the state monitor 128 determines after a predetermined time interval whether it has received a request by an enqueued contact to enter into the WNR state. If no such request has been received, the state monitor 128 waits the predetermined time interval and repeats step 200. If one or more state change requests have been received during the preceding time interval, the state monitor 128 proceeds to step 204.

The monitor 128 determines in step 204 whether the contact center is accepting the WNR state. There may be reasons why it is undesirable for the contact center to accept the state, such as unduly heavy contact volume. When the contact center is not accepting the WNR state, the state monitor 128 in step 208 retrieves an estimated wait time for the contact from the EWT agent and notifies the contact of the nonacceptance of the state change request and the estimated wait time to service. The monitor 128 then returns to step 200. When the contact center is accepting the WNR state, the state monitor 128 in step 212 notifies the contactor making the request that the contactor has been assigned the WNR state and that the state can be changed back to the WR state only by inputting a second predetermined code or hanging up and recontacting the contact center. Like the first code, the second code can be a predetermined set or sequence of bits, a feature access code or DTMF digit(s), a voice command, or any other type or form of signal. In step 216, the monitor changes the state assigned to the contact from the WR state to the WNR state. In one configuration, a flag field 140 is included within each data entry corresponding to an enqueued contact, and the flag field is set to a predetermined value to indicate that the flag has been set. For example, a "0" in the field can mean that the flag is not set and the contact has been assigned the WR state while a "1" in the field can mean that the flag is set and the contact has been assigned the WNR state. As will be appreciated the meanings of the values can be reversed.

In decision diamond 220, the state monitor 128 next determines if it has received from the selected contact a request to enter the WR state. If not, the state monitor repeats the query after a predetermined time interval has elapsed. If so, the state monitor proceeds to step 224 in which the WNR flag is unset (or assigned a value corresponding to the WR state) and then to step 228 in which the contactor is notified of the state change.

The steps of FIG. 2 can be repeated on a queue-by-queue basis or on a multiple queue basis.

Figure 3A:
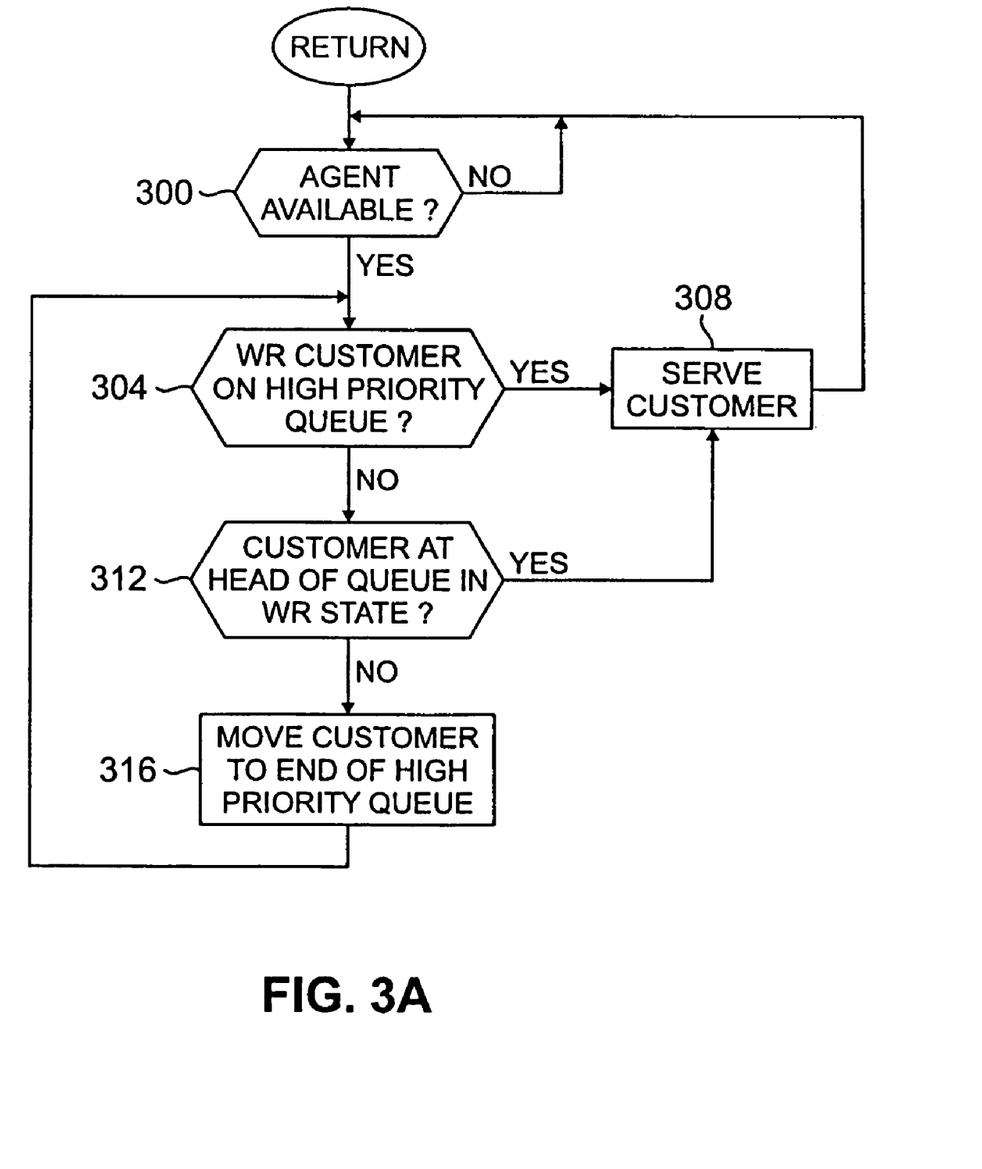
FIG. 3A is a flow diagram of operations of the selection agent in the contact center of FIG. 1.
Figure 3B:
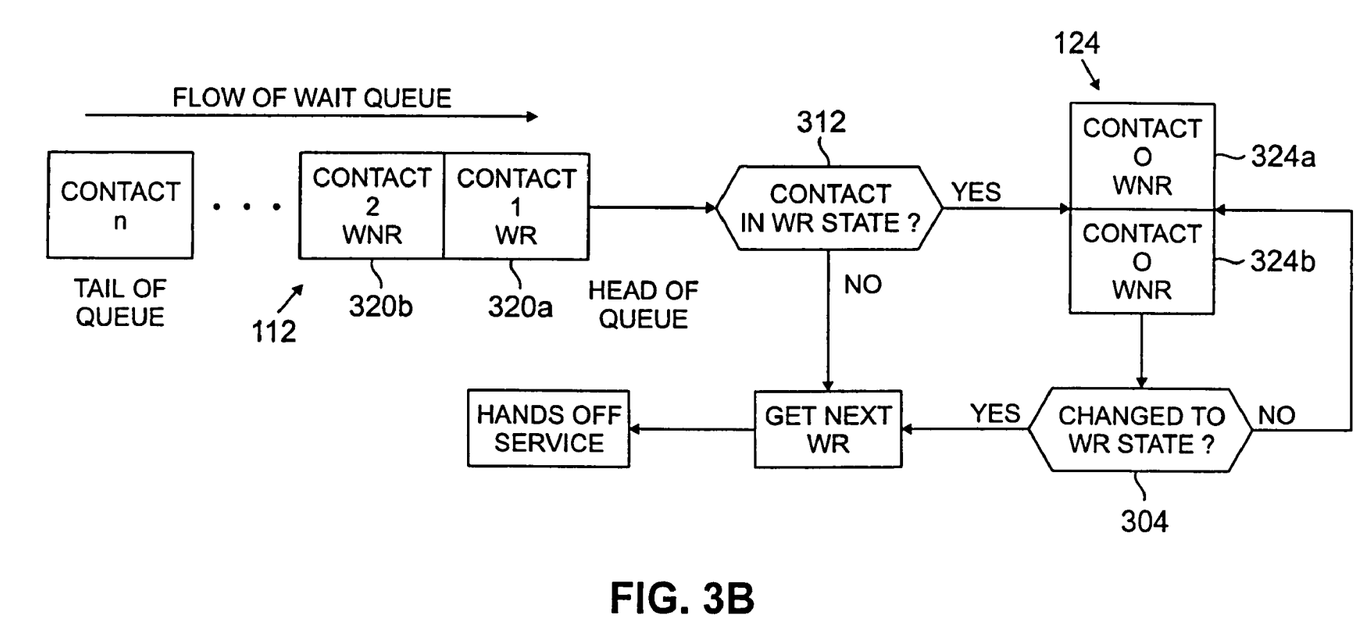
FIG. 3B is another flow diagram of operations of the selection agent in the contact center of FIG. 1.

Referring now to FIGS. 3A and B, the functionality of the selection agent 132 will now be described. In step 300, the agent 132 determines if a resource or agent is available for servicing an enqueued contact. If not, the agent 132 repeats step 300 after a predetermined time interval has elapsed. If so, the agent 132 proceeds to decision diamond 304.

In decision diamond 304, the agent 132 next determines whether the state monitor 128 has reassigned the WR state to one or more contacts enqueued in one of the high priority queues in queue set 120. The contact to which the WR state is reassigned is handed off for service in step 308. When multiple contacts have been reassigned the WR state during the predetermined time interval, the contacts are considered in the order in which the reassignment requests are received. Alternatively, the contacts can be selected based on the cumulative wait time, whether in the WR and/or WNR states. In this configuration, the contacts are selected in an order based on their cumulative wait times, e.g., the contact having the longest cumulative wait time is selected ahead of the contact having the next longest cumulative wait time and so on. The contact corresponding to the first received request is thus selected for service. If no contact has been reassigned the WR state, the agent 132 proceeds to decision diamond 312.

In decision diamond 312, the agent 132 determines whether a selected contact at the head of one of the queues 112 in queue set 110 is in the WR state. When the selected contact is not in the WR state but rather is in the WNR state, the contact is moved from its queue 112 in queue set 110 to a corresponding high priority queue 124 in queue set 120. When the selected contact is in the WR state, the contact is handed off to a resource 104 for service in step 312.

An example of the foregoing is illustrated by FIG. 3B. Referring to FIG. 3B, when a resource is available to service a next contact the selection agent 132 first determines whether either of the contacts 324a,b in the high priority queue 124 are now in the WR state. Since neither contact has changed to this state, the selection agent 132 selects contact 1 320a at the head of queue 112 for servicing. When a next resource is available to service a next contact, the agent 132 again determines whether either of the contacts in the high priority queue 124 are now in the WR state. If so, one of them is handed off for service ahead of contact 2 320b, who is now at the head of the queue 112. If not, contact 2 320b, who is in the WNR state, is moved to the high priority queue 124 and a next contact, or contact 3 (not shown), is handed off for service.

The steps of FIGS. 3A and 3B can be repeated on a queue-by-queue basis or on a multiple queue basis.

A number of variations and modifications of the invention can be used. It would be possible to provide for some features of the invention without providing others.

Figure 4:
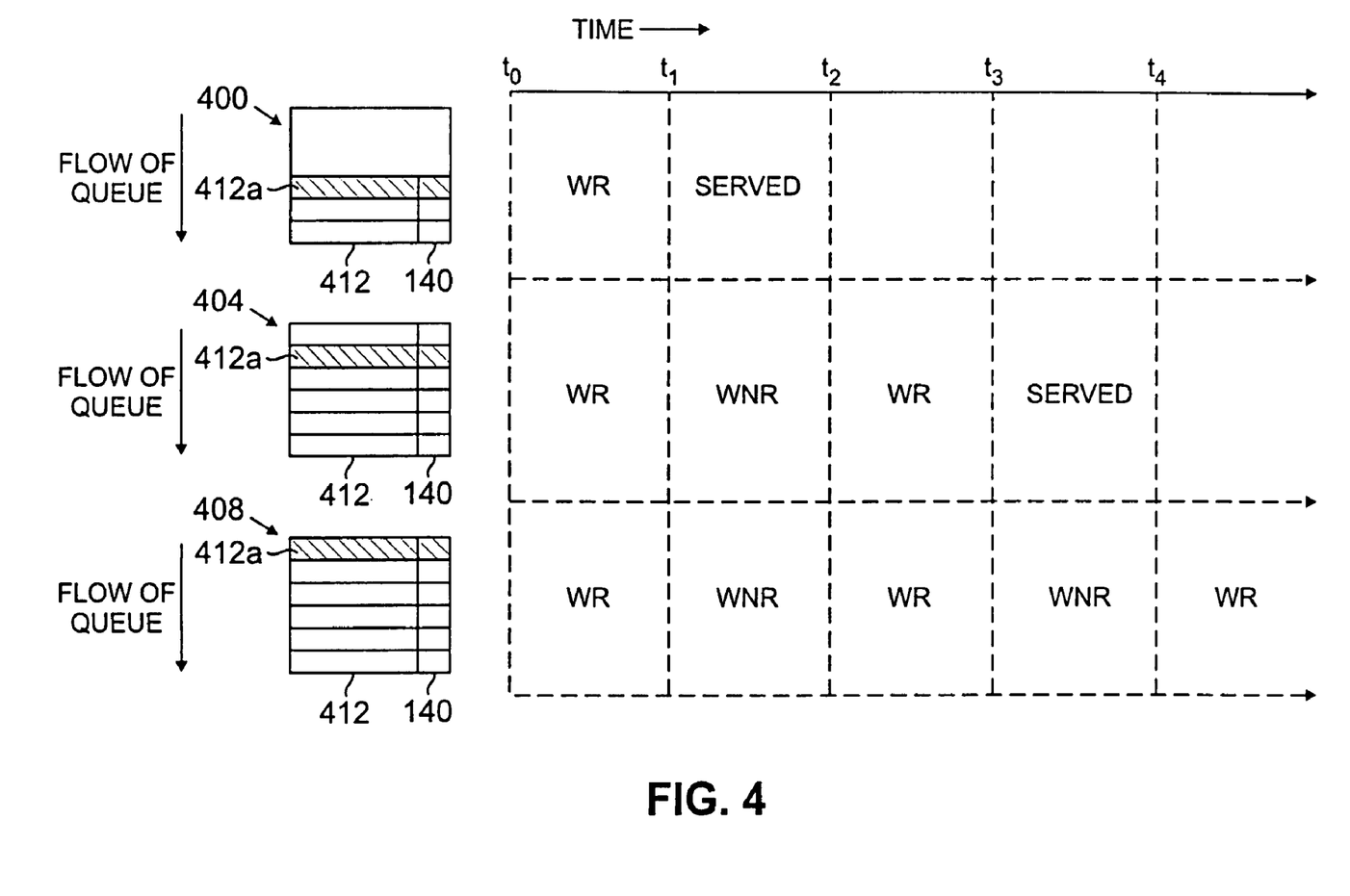
FIG. 4 depicts a second embodiment according to the present invention.
Figure 5:
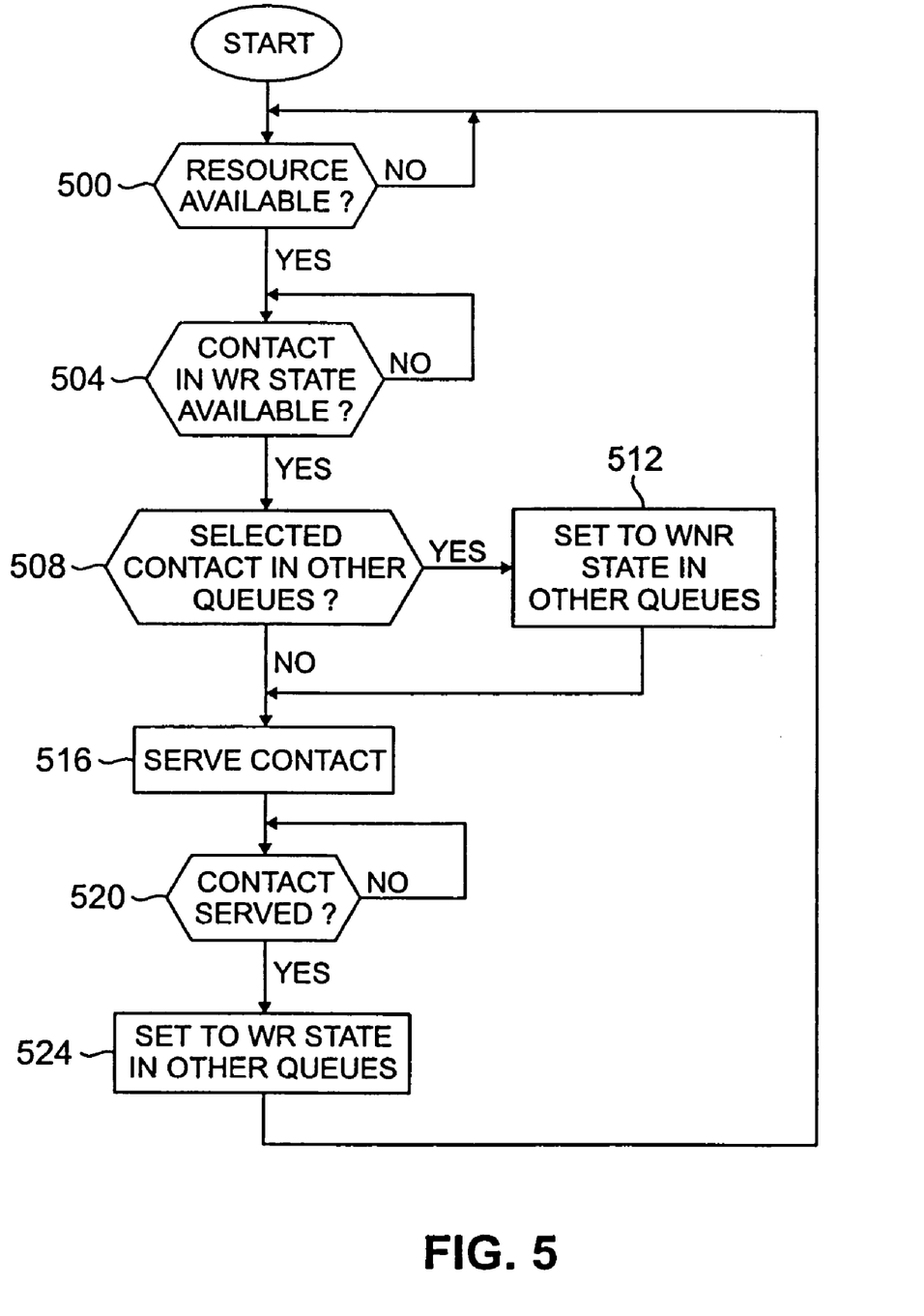
FIG. 5 is a flow diagram of operations of the selection agent in the second embodiment of FIG. 4.

For example, one alternative embodiment is depicted in FIGS. 4 and 5. In this embodiment, a contact has the option of waiting in multiple queues simultaneously. While being serviced in a first queue, the contact is placed automatically in the WNR state in at least a second queue. When service in the first queue is completed, the contact is placed automatically in the WR state in the second and other queues.

This embodiment is depicted by FIG. 4. FIG. 4 shows three queues, namely first, second and third queues 400, 404, and 408, respectively, each containing a plurality of contacts 412. To the right of the queues is a timeline showing, for different time intervals, the state for the contact in the corresponding queue. During a first time interval $t_0$-$t_1$, contact 412a is in the WR state in each of the first, second and third queues. During a second, later time interval, namely time interval $t_1$-$t_2$, the contact is eligible for service in the first queue 400 and is served by a first resource (not shown). The monitor 128 assigns the contact 412a to the WNR state in each of the second and third queues 404 and 408. During a third, later time interval, namely time interval $t_2$-$t_3$, the contact 412a is no longer in the first queue 400 as he or she has been fully served by the first resource and is reassigned to the WR states in the second and third queues 404 and 408. During a fourth, later time interval, namely time interval $t_3$-$t_4$, the contact is eligible for service in the second queue 404 and is served by a second resource (not shown). The monitor 128 assigns the contact 412a to the WNR state in the third queue 408. During a fifth, later time interval, namely time interval $t_4$-$t_5$, the contact 412a is no longer in the second queue 404 as he or she has been fully served by the second resource and is reassigned to the WR state in the third queue 408. This embodiment is particularly useful where a contact center has a number of contact options for different types of service. For example, a contact may choose to wait for an automated attendant but still wish to retain his queue position for a human agent in the event that the automated attendant fails to answer his or her question(s). In another application, the contact can wait in a first queue for technical support service and respond to a poll conducted by the contact center and/or receive sales information on a product in other queues.

A functional implementation of this embodiment is shown in FIG. 5. In steps 500 and 504, the selection agent 132 determines first whether a resource is available to service a contact and second whether a contact in the WR state is available for service, such as at the head of one or more queues (e.g., a high priority and/or normal or FIFO queue). The agent 132 repeats steps 500 and 504 as necessary until a resource and contact in the WR state is available.

When a resource and WR contact are available, the agent 132 proceeds to step 508 and determines whether the selected (WR state) contact is enqeueud for service in one or more other queues. If so, the state of the contact in the other queues is set by the state monitor 128 to the WNR state in step 512. If not or after the completion of step 508, the contact is served in step 516. After the monitor 128 determines in step 520 that the contact has been served, the WNR state is changed by the monitor 128 in step 524 to the WR state in each of the other queues.

In another alternative embodiment, a resource can cause a contact to be placed in the WNR state during servicing of the contact. This embodiment is useful where the contactor corresponding to the contact needs to collect information or attend to a duty and does not wish to have to terminate the contact and initiate a new contact. If a new contact is initiated, the contact would lose his or her position vis a vis other contacts in the queue 112.

In yet another embodiment, a high priority contact would not be used. Rather, a contact would request a wait time before, during or after the assignment from the WR state to the WNR state. The state monitor 128 would either relocate the contact to an appropriate position in the queue (i.e., a queue position having an estimated wait time corresponding to the requested wait time) and/or start a timer corresponding to the contact and consider the contact eligible for service only when the timer has expired.

In yet a further embodiment, the state monitor 128 and/or selection agent 132 are implemented, in whole or part, as a logic circuit, such as an Application Specific Integrated Circuit or ASIC.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of distributing contacts to a plurality of resources in a contact center, comprising:

(a) providing at least a first queue comprising contacts awaiting service by at least one resource of a contact center, wherein each of the contacts can wait in multiple queues simultaneously, and each of the contacts in each of the queues has a corresponding state, wherein a first state indicates that a contactor corresponding to the queued contact is ready to be serviced and a second state indicates at least one of an unwillingness of the contactor to be serviced and unavailability of the contactor for servicing; and (b) applying the following rules to the contacts in the first queue:

(B1) when a first contact is at the head of a first queue and has a first state, assigning an available resource to serve the first contact; and (B2) when the first contact is at the head of the first queue and has a second state different from the first state, not assigning an available resource to serve the first contact but assigning the available resource to serve a second contact in the first queue, the second contact having the first state and being later queued in the first queue than the first contact, the first contact remaining at the head of the queue until in the first state.

2. The method of claim 1, wherein, while the first contact is in the second state, advancing a position of the first contact in the first queue.

3. The method of claim 2, wherein the first contact is advanced in the same manner as if the first contact had the first state.

4. The method of claim 1, wherein an available resource is assigned to service the first contact when the first contact is at the head of the first queue and changes from the second state to the first state.

5. The method of claim 1, wherein, in a first operational mode, contacts in the first queue can have first and second states and, in a second operational mode, contacts in the first queue can have the first but not the second state and wherein the decision to implement, at a selected time, the first or second operational mode depends on contact center state.

6. The method of claim 1, wherein each of the contacts is enqueued in the first queue and the state of each contact is indicated by a state indicator, wherein, at a first time, the first contact has the first state, wherein, at a later second time, the first contact has the second state, wherein, at a third time later than the first and second times, the first contact has the first state and is assigned to a resource to be serviced, and wherein when rule (B2) applies the first contact is transferred from the first queue to a second queue different from the first queue.

7. The method of claim 1, further comprising:

(c) identifying a first resource that can service the first and a third contact, wherein the first contact is in the first queue, wherein the third contact is in a second queue, and wherein the first contact has the first state; and (d) applying the following rules:

(D1) when the second contact has the first state, assigning the first resource to serve the second contact; and (D2) when the second contact has the second state, assigning the first resource to serve the first contact.

8. The method of claim 1, further comprising:

(c) receiving a first code from the first contact, the first contact being in the first state; and (d) in response to the first code, changing the state of the first contact from the first state to the second state;

(e) thereafter receiving a second code from the first contact; and (f) in response to the second code, changing the state of the first contact from the second state back to the first state.

9. The method of claim 1, wherein first and second queues of contacts are provided, wherein each of the contacts in the first and second queues has a corresponding state, wherein the first queue is served by a first set of resources and the second queue is served by a second set of resources, wherein the first set of resources is different from the second set of resources, and wherein the first contact is queued in each of the first and second queues and further comprising:

before the first contact is served by an available resource in the first set of resources, assigning the first state to the first contact with respect to the first and second queues;

while the first contact is being served by a resource in the first set of resources, assigning the second state to the first contact with respect to the second queue; and after the first contact has been served by the resource in the first set of resources, assigning the first state to the first contact with respect to the second queue.

10. The method of claim 1, wherein a resource places the first contact in the second state to permit the resource to perform a selected operation and later returns the first contact to the first state when the selected operation has been performed.

11. A computer readable medium encoded with computer executable instructions for performing the steps of claim 1.

12. The method of claim 1, wherein the first and second contacts are at the head of the first queue at substantially the same time and wherein the first contact has the first state and the second contact has the second state.

13. The method of claim 1, wherein said first state is a waiting and ready state and said second state is a waiting but not ready state.

14. The method of claim 1, when the first contact is at the head of the first queue, further comprising:

identifying a first resource that can service a first contact;

when the first contact has the first state, assigning the first resource to service the first contact; and when the first contact has the second state, allowing the first resource to remain available.

15. A system for distributing contacts to a plurality of resources in a contact center, comprising:

at least one resource for serving contacts;

at least a first queue of contacts awaiting service by the at least one resource, wherein each of the contacts can wait in multiple queues simultaneously and each of the contacts in each of the queues has a corresponding state; and a selection agent operable to assign an available resource to serve a selected contact when the selected contact is at the head of the first queue and has a first state and not assign the resource to serve the selected contact when the selected contact is at the head of the first queue but has a second state different from the first state, wherein the first state indicates that a contactor corresponding to the selected contact is ready to be serviced and the second state indicates at least one of an unwillingness of the contactor to be serviced and unavailability of the contactor for servicing, and wherein, while the selected contact is in the second state, the selection agent advances a position of the selected contact in the first queue in the same manner as if the selected contact had the first state until such time that the first contact is at the head of the queue where the first contact remains until they are in the first state.

16. The system of claim 15, wherein the selection agent applies the following rules:
when a first contact is at the head of a first queue and has a first state, assigning an available resource to serve the first contact; and
when the first contact is at the head of the first queue and has a second state different from the first state, not assigning an available resource to serve the first contact but assigning the available resource to serve a second contact in the first queue, the second contact having the first state and being later queued than the first contact.

17. The system of claim 15, wherein each of the contacts is queued in the first queue and the state of each contact is indicated by a state indicator, wherein the first queue includes a first contact, wherein, at a first time, the first contact has the first state, wherein, at a later second time, the first contact has the second state, wherein, at a third time later than the first and second times, the first contact has the first state and is assigned to a resource to be serviced, and wherein selection agent transfers a contact having the second state from the first queue to a second queue different from the first queue when the contact in the first queue has the second state.

18. The system of claim 15, wherein the selection agent identifies a first resource that can service first and second contacts, wherein the first contact is in the first queue, wherein the second contact is in the second queue, wherein the first contact has the first state, and wherein the selection agent, when the second contact has the first state, assigns the first resource to serve the second contact and, when the second contact has the second state, assigns the first resource to serve the first contact.

19. The system of claim 15, further comprising:
an input for receiving a first code from a first contact, the first contact being in the first state; and
in response to the first code, a state monitor operable to change the state of the first contact from the first state to the second state, wherein the input thereafter receives a second code from the first contact and wherein, in response to the second code, the state monitor changes the state of the first contact from the second state back to the first state.

20. The system of claim 19, further comprising:
a second queue of contacts, wherein each of the contacts in the first and second queues has a corresponding state, wherein the first queue is served by a first set of resources and the second queue is served by a second set of resources, wherein the first set of resources is different from the second set of resources, wherein a first contact is queued in each of the first and second queues, and wherein, before the first contact is served by the resource in the first set of resources, the state monitor assigns the first state to the first contact with respect to the first and second queues and, when the first contact is being served by a resource in the first set of resources, the state monitor assigns the second state to the first contact with respect to the second queue.

21. The system of claim 20, wherein, after the first contact has been served by the resource in the first set of resources, the state monitor assigns the first state to the first contact with respect to the second queue.

22. The system of claim 15, wherein first and second contacts are at the head of the first queue at substantially the same time and wherein the first contact has the first state and the second contact has the second state.

23. The system of claim 15, wherein said first state is a waiting and ready state and said second state is a waiting but not ready state.

24. The system of claim 15, when the first contact is at the head of the first queue, wherein the resource selection means identifies a first resource that can service a first contact, and wherein the resource selection means, when the first contact has the first state, assigns the first resource to service the first contact and, when the first contact has the second state, allows the first resource to remain available.

25. A system for distributing contacts to a plurality of resources in a contact center, comprising:
(a) at least one resource to serve contacts;
(b) at least a first queue of contacts awaiting service by the at least one resource, wherein each of the contacts can wait in multiple queues simultaneously and each of the contacts in each of the queues has a corresponding state, wherein a first state indicates that a contactor corresponding to a contact is ready to be serviced and a second state indicates at least one of an unwillingness of the contactor to be serviced and unavailability of the contactor for servicing; and
(c) a selection agent operable to apply the following rules:
(C1) when a first contact is at the head of a first queue and has a first state, assign an available resource to serve the first contact; and
(C2) when the first contact is at the head of the first queue and has a second state different from the first state, not assign an available resource to serve the first contact but assign the available resource to serve a second contact in the first queue, the second contact having the first state and being later queued in the first queue than the first contact, the first contact remaining at the head of the queue until in the first state.

26. The system of claim 25, wherein, while a selected contact is in the second state, the selection agent advances a position of the selected contact in the first queue in the same manner as if the selected contact had the first state.

27. The system of claim 25, wherein each of the contacts is queued in the first queue and the state of each contact is indicated by a state indicator, wherein the first queue includes the first contact, wherein, at a first time, the first contact has the first state, wherein, at a later second time, the first contact has the second state, wherein, at a third time later than the first and second times, the first contact has the first state and is assigned to a resource to be serviced, and wherein selection agent transfers a contact having the second state from the first queue to a second queue different from the first queue when the contact in the first queue has the second state.

28. The system of claim 25, wherein the selection agent identifies a first resource that can service first and second contacts, wherein the first contact is in the first queue, wherein the second contact is in the second queue, wherein the first contact has the first state, and wherein the selection agent, when the second contact has the first state, assigns the first resource to serve the second contact and, when the second contact has the second state, assigns the first resource to serve the first contact.

29. The system of claim 25, further comprising:
an input for receiving a first code from a first contact, the first contact being in the first state; and
in response to the first code, a state monitor operable to change the state of the first contact from the first state to the second state, wherein the input thereafter receives a second code from the first contact and wherein, in response to the second code, the state monitor changes the state of the first contact from the second state back to the first state.

30. The system of claim 29, further comprising:

a second queue of contacts, wherein each of the contacts in the first and second queues has a corresponding state, wherein the first queue is served by a first set of resources and the second queue is served by a second set of resources, wherein the first set of resources is different from the second set of resources, wherein a first contact is queued in each of the first and second queues, and wherein, before the first contact is served by the resource in the first set of resources, the state monitor assigns the first state to the first contact with respect to the first and second queues and, when the first contact is being served by a resource in the first set of resources, the state monitor assigns the second state to the first contact with respect to the second queue.

31. The system of claim 30, wherein, after the first contact has been served by the resource in the first set of resources, the state monitor assigns the first state to the first contact with respect to the second queue.

32. The system of claim 25, wherein a first and second contact are at the head of the first queue at substantially the same time and wherein the first contact has the first state and the second contact has the second state.

33. The system of claim 25, wherein said first state is a waiting and ready state and said second state is a waiting but not ready state.

34. The system of claim 25, when the first contact is at the head of the first queue, wherein the selection agent is operable to identify a first resource that can service a first contact, and wherein the selection agent is operable, when the first contact has the first state, to assign the first resource to serve the first contact and, when the first contact has the second state, to allow the first resource to remain available.

35. A method of distributing contacts to a plurality of resources in a contact center, comprising:

(a) providing at least a first queue comprising contacts awaiting service by at least one resource of a contact center, wherein each of the contacts can wait in multiple queues simultaneously and each of the contacts in each of the queues has a corresponding state, wherein a first state indicates that a contactor corresponding to the queued contact is ready to be serviced and a second state indicates at least one of an unwillingness of the contactor to be serviced and unavailability of the contactor for servicing, and wherein a contactor and resource each have the ability to place the first contact in the second state to permit the customer and/or resource to perform a selected operation and later return the first contact to the first state when the selected operation has been performed; and (b) applying the following rules to the contacts in the first queue:

(B1) when a first contact is at the head of a first queue and has a first state, assigning an available resource to serve the first contact; and (B2) when the first contact is at the head of the first queue and has a second state different from the first state, not assigning an available resource to serve the first contact but assigning the available resource to serve a second contact in the first queue, the second contact having the first state and being later queued in the first queue than the first contact, the first contact remaining at the head of the queue until in the first state.

36. The method of claim 35, wherein, while the first contact is in the second state, advancing a position of the first contact in the first queue, wherein the first contact is advanced in the same manner as if the first contact had the first state, wherein an available resource is assigned to service the first contact when the first contact is at the head of the first queue and changes from the second state to the first state.

* * * * *

UNITED STATES PATENT AND TRADEMARK OFFICE
CERTIFICATE OF CORRECTION

PATENT NO. : 7,620,169 B2 Page 1 of 1
APPLICATION NO. : 10/174278
DATED : November 17, 2009
INVENTOR(S) : Harkreader et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1042 days.

Signed and Sealed this

Twenty-sixth Day of October, 2010

David J. Kappos
*Director of the United States Patent and Trademark Office*